(12) United States Patent
Hamabe et al.

(10) Patent No.: US 6,245,383 B1
(45) Date of Patent: Jun. 12, 2001

(54) METHOD FOR MANUFACTURING PREPREG IN WHICH REINFORCING SUBSTRATE IS IMPREGNATED WITH THERMOSETTING MATRIX RESIN

(75) Inventors: Ryuichi Hamabe, Kadoma; Hiroshi Harada, Hirakata; Noriaki Sugimoto, Osaka, all of (JP); Hiroyuki Mori, Portland, OR (US); Toshihiro Yaji; Yoshinori Matsuzaki, both of Koriyama (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/407,764

(22) Filed: Sep. 29, 1999

(30) Foreign Application Priority Data

Nov. 25, 1998 (JP) .................................................. 10-334822

(51) Int. Cl.[7] ...................................................... B05D 1/28
(52) U.S. Cl. .................. 427/211; 427/385.5; 427/389.8; 427/428; 427/350; 427/359
(58) Field of Search ............................... 427/211, 385.5, 427/389.8, 428, 350, 359

(56) References Cited

U.S. PATENT DOCUMENTS 5,492,722 * 2/1996 Tait et al. .............................. 427/211

FOREIGN PATENT DOCUMENTS 63-153107 * 6/1988 (JP) .
95/18000 * 7/1995 (WO) .

* cited by examiner

Primary Examiner—Katherine A. Bareford
(74) Attorney, Agent, or Firm—Oblon, Spivak, McClelland, Maier & Neustadt, P.C.

(57) ABSTRACT

A method for manufacturing a prepreg in which a reinforcing substrate is impregnated with a thermosetting matrix resin. In the method, the reinforcing substrate is moved in a traveling direction. The thermosetting matrix resin is supplied to an outer circumferential surface of a transferring roller. The thermosetting matrix resin which substantially contains no solvent and which is in a molten state is transferred from the outer circumferential surface of the transferring roller to a first surface of a reinforcing substrate while the reinforcing substrate moves. The thermosetting matrix resin which is transferred to the first surface is forced to permeate through the reinforcing substrate by pressing at least one pressing roller on the thermosetting matrix resin transferred to the first surface while the reinforcing substrate moves. The reinforcing substrate impregnated with the thermosetting matrix resin is heated to semi-cure the thermosetting matrix resin.

10 Claims, 9 Drawing Sheets

METHOD FOR MANUFACTURING PREPREG IN WHICH REINFORCING SUBSTRATE IS IMPREGNATED WITH THERMOSETTING MATRIX RESIN

CROSS-REFERENCE TO RELATED APPLICATIONS

The present application claims priority under 35 U.S.C. §119 to Japanese Patent Application No. 10-334,822, filed Nov. 25, 1998, now publication No. 2000-219754, published August 2000, entitled "Method And Apparatus For Manufacturing Prepreg." The contents of that application are incorporated herein by reference in their entirety.

BACKGROUND OF THE INVENTION

1. Field of the Invention

The present invention relates to a method and an apparatus for manufacturing a prepreg, in which the prepreg is made of a fibrous reinforcing substrate coated and impregnated with a thermosetting matrix.

2. Description of Background Information

Japanese Laid-Open Patent Application No. HEI 8-281645 discloses a technique for continuously manufacturing a prepreg by allowing a long sheet-shape fibrous reinforcing substrate to be coated and impregnated with a thermosetting matrix resin containing no solvent while the reinforcing substrate travels.

In detail, this technique shows a prepreg manufacturing method which includes a first coating process for applying a thermosetting matrix resin containing no solvent in a molten state onto one surface of a sheet-shape reinforcing substrate by using a die coater, a process for heating the reinforcing substrate coated with the thermosetting matrix resin by a heating unit of a non-contact type so that the reinforcing material is impregnated with a thermosetting matrix resin, a second coating process for applying a thermosetting matrix resin to the reinforcing substrate impregnated with the thermosetting matrix resin on its surface opposite to the resin-coated surface by the first coating process by using a die coater, and a process for heating the reinforcing substrate coated and impregnated with the thermosetting matrix resin by a heating unit of a non-contact type so as to semi-cure the thermosetting matrix resin to form a sheet-shape prepreg.

However there are some problems in this technique. That is, since a die coater is used to apply the thermosetting matrix resin onto the reinforcing substrate, the thermosetting matrix resin tends to easily adhere to the inside of the die coater. Accordingly, the coating precision deteriorates and long time is required to clean and maintain the die coater. Moreover, although a die coater itself is very expensive device, it is necessary that two die coaters are respectively placed on one surface and on another surface of the reinforcing substrate so as to apply the thermosetting matrix resin on the respective surfaces. As a result, equipment costs are high. Furthermore, since the thermosetting matrix resin is applied to the both surfaces of the reinforcing substrate, air inside the reinforcing material tends to be entrapped by the matrix resin. Accordingly, voids are likely to occur in the prepreg.

SUMMARY OF THE INVENTION

It is an object of the present invention to provide a method and an apparatus for manufacturing a prepreg in which a prepreg is manufactured without causing many tasks for cleaning and maintaining the apparatus.

Another object of the present invention is to provide a method and an apparatus for manufacturing a prepreg in which the equipment costs is reduced.

Yet another object of the present invention is to provide a method and an apparatus for manufacturing a prepreg in which generation of voids is prevented.

The object is achieved according to the present invention by providing a novel method for manufacturing a prepreg in which a reinforcing substrate is impregnated with a thermosetting matrix resin. In the method, the reinforcing substrate is moved in a traveling direction. The thermosetting matrix resin is supplied to an outer circumferential surface of a transferring roller. The thermosetting matrix resin which substantially contains no solvent and which is in a molten state is transferred from the outer circumferential surface of the transferring roller to a first surface of a reinforcing substrate while the reinforcing substrate moves. The thermosetting matrix resin which is transferred to the first surface is forced to permeate through the reinforcing substrate by pressing at least one pressing roller on the thermosetting matrix resin transferred to the first surface while the reinforcing substrate moves. The reinforcing substrate impregnated with the thermosetting matrix resin is heated to semi-cure the thermosetting matrix resin.

According to the method of the present invention, the application of the thermosetting matrix resin onto the reinforcing substrate can be carried out by transferring by using the transferring roller, it is not necessary to take so many tasks in cleaning and maintenance. In addition, equipment costs for manufacturing prepreg can be lowered because the transferring roller is inexpensive as compared with the die coaters. Moreover, the thermosetting matrix resin transferred to the first surface of the reinforcing substrate is forced to permeate through the reinforcing substrate to the second surface thereof by using the pressing roller. Namely, both surfaces and the inside of the reinforcing substrate are coated and impregnated with the thermosetting matrix resin simply by transferring the thermosetting matrix resin to the first surface of the reinforcing substrate by using the transferring roller and then pressing the pressing roller thereon. Thus, it is not necessary to respectively arrange two separate application devices for applying both surfaces of the reinforcing substrate such as the conventional method of using two die coaters arranged in the both side of the reinforcing substrate. Therefore the equipment costs can be further reduced. Furthermore, since air inside the reinforcing substrate easily escapes from the second surface thereof without being entrapped therein by the matrix resin, the generation of voids on the obtained prepreg can be prevented.

In the present invention, a heating device, which is for heating the thermosetting matrix resin transferred to the reinforcing substrate, may be placed on the side of the second surface of the reinforcing substrate in a non-contact manner. With heating the transferred thermosetting matrix resin on the reinforcing substrate by the heating device, the thermosetting matrix resin can be kept in such an desirable molten state as not to lower its viscosity, thereby promoting the thermosetting matrix resin to permeate into the reinforcing substrate. As a result, thermosetting matrix resin permeates the reinforcing substrate well.

Optionally a plurality of the pressing rollers may be arranged along the advancing direction of the reinforcing substrate. In this case, since the thermosetting matrix resin transferred to the first surface of the reinforcing substrate can be pressed plural times by the respective pressing rollers to permeate through the reinforcing substrate to the second surface of the reinforcing substrate, it is possible to control the amount of permeation of the thermosetting matrix resin more precisely.

Optionally, a backup sheet having mold release characteristics with respect to the thermosetting matrix resin may be arranged in a position of confronting with the pressing roller in such a manner as to contact the second surface of the reinforcing substrate. In this case, the thermosetting matrix resin can be allowed to spread on the second surface of the reinforcing substrate by utilizing the surface tension of the backup sheet, thereby making it possible to uniformly apply and spread the thermosetting matrix resin on the second surface of the reinforcing substrate and consequently to increase the amount of application and spread thereof.

Optionally, air pressure in the side of the second surface of the reinforcing substrate may be reduced. In this case, the thermosetting matrix resin transferred on the first surface of the reinforcing substrate can be allowed to easily permeate through the reinforcing substrate to the second surface thereof because of pressure difference occurring between the first surface and the second surface of the reinforcing substrate. Therefore, the rate of permeation of the thermosetting matrix resin by the pressing roller can be increased as well as the amount of application and spread can be increased.

Optionally, the pressing roller may be rotated in a reversed direction against the traveling direction of the reinforcing substrate. In this case, the thermosetting matrix resin in a molten state transferred on the first surface of the reinforcing substrate is subjected to a rubbing action against the reinforcing substrate by pressure from the pressing roller. Therefore, by adjusting the rotation speed of the pressing roller, the amount of permeation of the thermosetting matrix resin can be easily controlled.

Optionally, the pressing roller may be rotated in the same direction as the advancing direction of the reinforcing substrate. In this case, by adjusting a winding angle of the reinforcing substrate against the pressing roller, it becomes possible to easily control the amount of permeation of the thermosetting matrix resin.

Optionally, a wiping roller shifting the reinforcing substrate so as to wrap the reinforcing substrate around the transferring roller may be installed. In this case, the thermosetting matrix resin on the surface of the transferring roller can be wiped out with the reinforcing substrate wound around the transferring roller by the wiping roller, thereby making it possible to prevent the thermosetting matrix resin from adhering on the surface of the transferring roller in the event of some troubles such as a temporary stoppage of the transferring roller.

Further, the object is achieved according to the present invention by providing a novel apparatus for manufacturing a prepreg which includes a feeder, a transferring roller, a resin supplier, at least one pressing roller and a heater. The feeder is configured to feed a fibrous reinforcing substrate which has a long sheet-shape and travels in the apparatus. The transferring roller is configured to transfer a thermosetting matrix resin in a molten state which is supplied to an outer circumferential surface of the transferring roller onto a first surface of the reinforcing substrate. The resin supplier is configured to supply the thermosetting matrix resin to the outer circumferential surface of the transferring roller. The at least one pressing roller is configured to force the thermosetting matrix resin which is transferred to the first surface to permeate through the reinforcing substrate by pressing the at least one pressing roller on the thermosetting matrix resin transferred to the first surface. The heater is configured to heat the reinforcing substrate impregnated with the thermosetting matrix resin to semi-cure the thermosetting matrix resin.

Optionally, in the apparatus, an accumulator being operated upon switching the reinforcing substrate over may be employed.

Optionally, in the apparatus, a resin gun for supplying the thermosetting matrix resin in a molten state onto the transferring roller may be employed. In this time, for a sake of feeding the thermosetting matrix resin containing no solvent into the resin gun, a resin feeder may be employed.

Optionally, in the apparatus, in the apparatus, a metering roller for uniformly spreading the thermosetting matrix resin in a molten state on the surface of the transferring roller may be employed.

Optionally, in the apparatus, a back-up roller for pressing the reinforcing substrate onto the transferring roller may be employed.

Other objects, features and advantages of the present invention may be ascertained by reviewing the present disclosure and the accompanying drawings.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

The preferred embodiments will now be described with reference to the accompanying drawings, wherein like reference numerals designate corresponding or identical elements throughout the various drawings.

Figure 1:
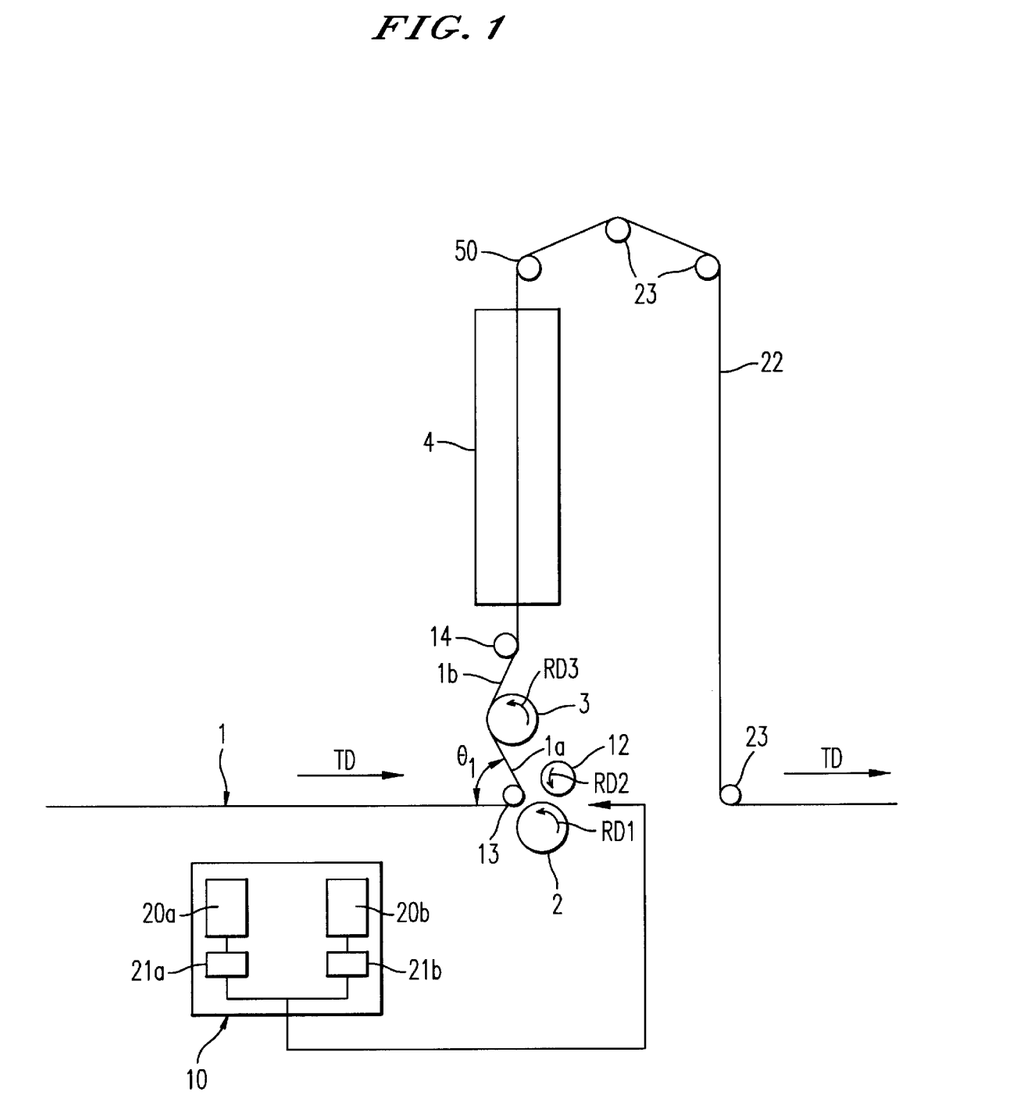
FIG. 1 is a schematic view that shows a prepreg manufacturing apparatus according to a first embodiment of the present invention.

FIG. 1 shows a prepreg manufacturing apparatus according to a first embodiment of the present invention. Referring to FIG. 1, a reinforcing substrate 1 having a long sheet-shape travels along a traveling direction (TD). The reinforcing substrate 1 is made by elongating a fibrous material such as glass cloth. A back-up roller 13, a supporting roller 14 and a first transport roller 50 are arranged such that the reinforcing substrate 1 travels straight. The traveling direction (TD) of the reinforcing substrate 1 is changed at the back-up roller 13. The angle $\theta_1$ between a traveling direction of the reinforcing substrate 1 approaching the back-up roller 13 and a traveling direction of the reinforcing substrate 1 going away from the back-up roller 13 is less than 90°, preferably less than 80°. A transferring roller 2 is arranged facing the back-up roller 13. The reinforcing substrate 1 travels between the back-up roller 13 and the transferring roller 2. The transferring roller 2 is driven in a rotational direction (RD1) opposite to the traveling direction (TD) of the reinforcing substrate 1. Namely, the moving directions of the reinforcing substrate 1 and the transferring roller 2 are opposite at the facing surfaces hereof. A metering roller 12 is arranged in the vicinity of he transferring roller 2 and at a downstream of the transferring roller 2 in the traveling direction (TD). The entering roller 12 is driven in the same rotational direction (RD2) as that of the transferring roller 2. A pressing roller 3 is provided at a downstream of the metering roller 12 and between the back-up roller 13 and the supporting roller 14 along the traveling direction (TD) of the reinforcing substrate 1. The pressing roller 3 is driven in a rotational direction (RD3) opposite to the traveling direction (TD) of the reinforcing substrate 1. Namely, the moving directions of the reinforcing substrate 1 and the pressing roller 3 are opposite at the facing surfaces thereof. A heating unit 4 is provided between the supporting roller 14 and the first transport roller 50 along the traveling direction (TD). The heating unit 4 is designed to apply heat in a non-contact manner, for example, by a heated air circulating in the heating unit 4.

As a thermosetting matrix resin with which the reinforcing substrate 1 is impregnated, for example, epoxy resins of the non-solvent type can be used. In the first embodiment, a resin-feeding unit 10 supply the thermosetting matrix resin to the outer circumferential surface of the transferring roller 2. The resin-feeding unit 10 includes a first tank (20a) which stores a composition (main agent) having a thermosetting resin as its main component, a second ank (20b) which stores a composition having a curing agent as ts main component, and measuring pumps (21a and 21b) which re constituted by gear pumps. The measuring pumps (21a and 21b) supply desired amount of the compositions from the tanks (20a and 20b), respectively. Then the measured compositions are mixed. The non-solvent type thermosetting matrix resin which is a mixture of the respective compositions is fed to the outer circumferential surface the transferring roller 2 in a molten state. The thermosetting matrix resin in a molten state fed onto the outer circumferential surface of the transferring roller 2 is spread on the outer circumferential surface of the transferring roller 2 by the metering roller 12 to form a uniform thin film on the outer circumferential surface of the transferring roller 2.

The reinforcing substrate 1 is pressed on the transferring roller 2 by a back-up roller 13. Accordingly, the uniform film of the thermosetting matrix resin formed on the outer circumferential surface of the transferring roller 2 is transferred to one surface (a first surface (1a)) of the reinforcing substrate 1. As a result, a uniform film of the thermosetting matrix resin is formed on the first surface (1a) of the reinforcing substrate 1. Since the thermosetting matrix resin transferred to the first surface (1a) of the reinforcing substrate 1 is in a molten state, the thermosetting matrix resin naturally permeates the reinforcing substrate 1. In this manner, the thermosetting matrix resin is applied to the reinforcing substrate 1 by the transferring roller 2. Therefore it is not necessary to use a die coater and consequently there is no problem that the thermosetting matrix resin hardens inside the die coater.

Next, the reinforcing substrate 1 coated with the transferred thermosetting matrix resin in a molten state travels to the pressing roller 3. The pressing roller 3 is arranged so as to press the first surface (1a) of the reinforcing substrate 1 on which the thermosetting matrix resin is coated. When the reinforcing substrate 1 passes the pressing roller 3 while contacting the outer circumferential surface of the pressing roller 3, the thermosetting matrix resin on the first surface (1a) of the reinforcing substrate 1 is pressed by the pressing roller 3 so as to permeate thorough Addl the reinforcing substrate 1 to the other surface (a second surface (1b)) of the reinforcing substrate 1. In this manner, by merely applying the thermosetting matrix resin on one surface of the reinforcing substrate 1 by using the transferring roller 2, the reinforcing substrate 1 is uniformly impregnated with the thermosetting matrix resin. Therefore, it is not necessary to install die coaters on both sides of the reinforcing substrate 1, which are used in the conventional apparatus to apply the thermosetting matrix resin on the both sides of the reinforcing substrate 1. Moreover, since the thermosetting matrix resin is transferred onto the first surface of the reinforcing substrate 1 by the transferring roller 2 and the thermosetting matrix resin transferred onto the first surface (1a) is pushed into the reinforcing substrate 1 to permeate it by pressing the pressing roller 3 on the same side (the first surface) of the reinforcing substrate 1, air contained inside the reinforcing substrate 1 easily escapes from the second surface of the reinforcing substrate 1 without being entrapped therein. Therefore, the generation of voids in the reinforcing substrate 1 can be prevented.

In order to control an amount of the thermosetting matrix resin which permeates through the reinforcing substrate 1 to the second surface (1b), the pressing roller 3 is rotated in either direction opposite to or same as the traveling direction (TD) of the reinforcing substrate 1, and otherwise stopped.

Figure 2:
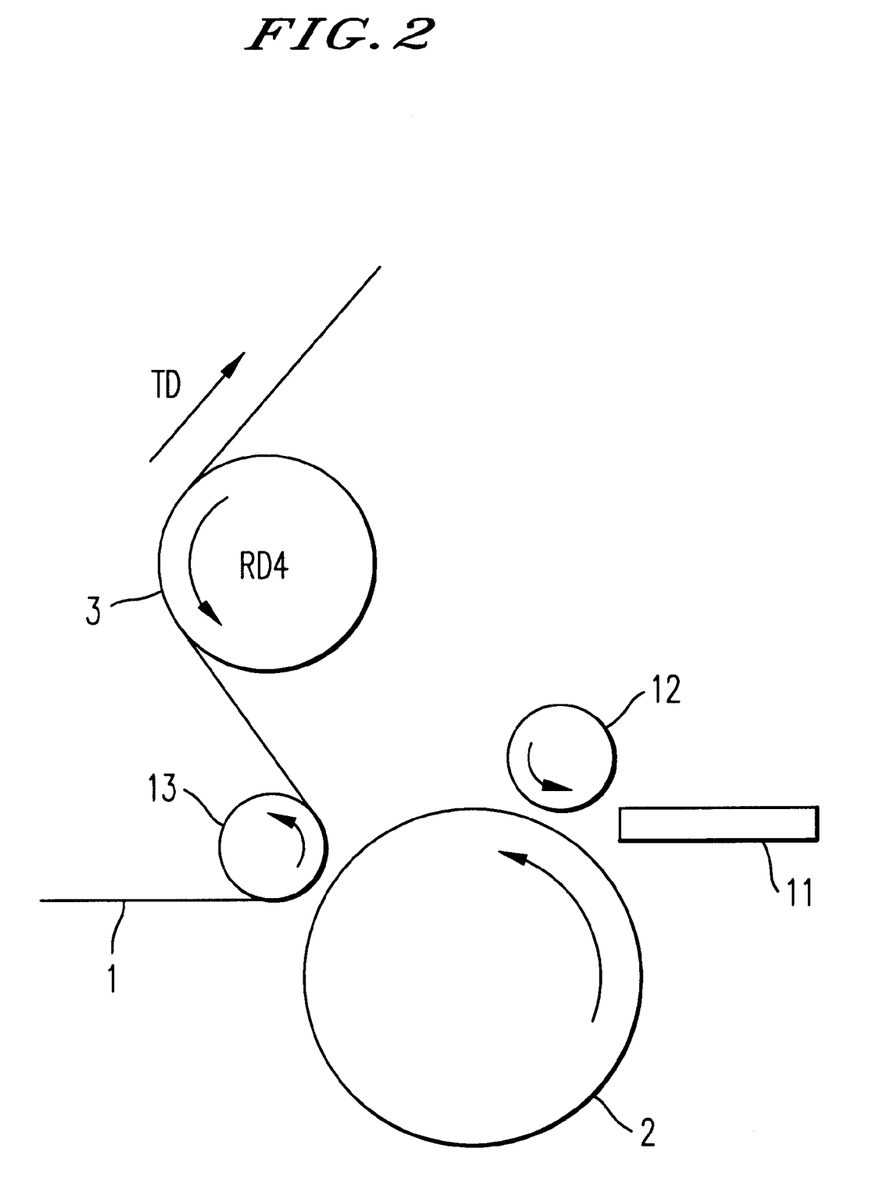
FIG. 2 is a partially enlarged schematic view of the first embodiment, the pressing roller rotating in a reversed direction against the traveling direction of the reinforcing substrate.

For example, referring to FIG. 2, the pressing roller 3 is driven in a rotational direction (RD4) opposite to the traveling direction (TD) of the reinforcing substrate 1. Namely, the moving directions of the reinforcing substrate 1 and the pressing roller 3 are opposite at the facing surfaces thereof. In this manner, since opposing faces of the reinforcing substrate 1 and the pressing roller 3 moves in opposite directions, the thermosetting matrix resin in a molten state on the first surface of the reinforcing substrate 1 is pressed into the reinforcing substrate 1 by the pressing roller 3. The pressing force of this pressing action becomes stronger as the rotational speed (peripheral velocity) of the pressing roller 3 increases, and consequently the amount of the thermosetting matrix resin which permeates through the reinforcing substrate 1 to the second surface thereof increases. Therefore, by adjusting the rotational speed (peripheral velocity) of the pressing roller 3, the permeation amount of the thermosetting matrix resin is easily controlled.

Figure 3:
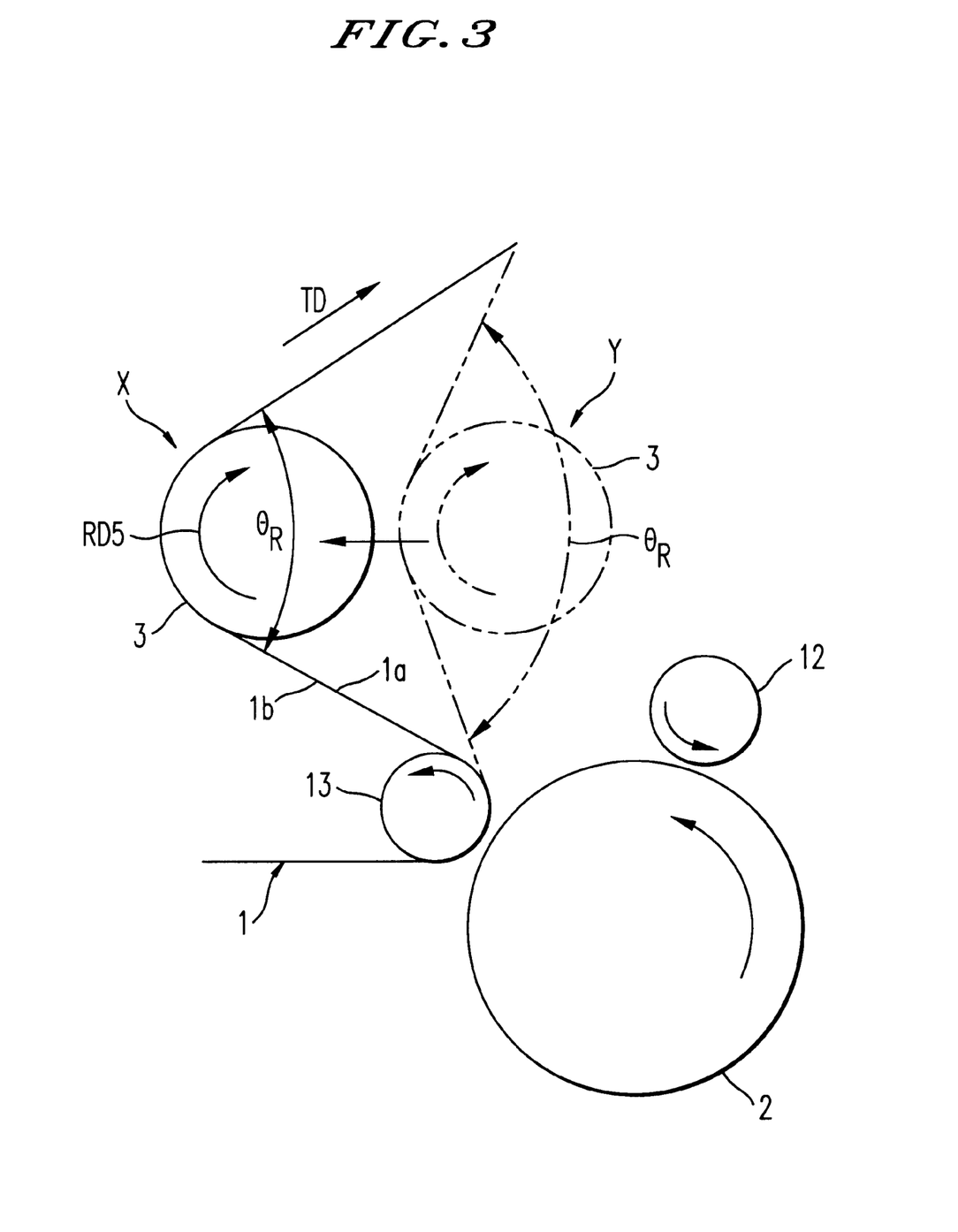
FIG. 3 is a partially enlarged schematic view of the first embodiment, the pressing roller rotating in the same direction as the traveling direction of the reinforcing substrate.

On the other hand, referring to FIG. 3, the pressing roller 3 is driven in a rotational direction (RD5) same as the traveling direction (TD) of the reinforcing substrate 1. Namely, the moving directions of the reinforcing substrate 1 and the pressing roller 3 are the same at the facing surfaces thereof. In this manner, since opposing faces of the reinforcing substrate 1 and the pressing roller 3 move in the same direction, the thermosetting matrix resin in a molten state on the first surface of the reinforcing substrate 1 is pressed into the reinforcing substrate 1 to permeate it to the second surface thereof by a pressurizing action of the pressing roller 3. Therefore, in the case where the length of a contacting portion of the reinforcing substrate 1 which contacts the pressing roller 3 is short because a winding angle $\theta_R$ of the reinforcing substrate 1 around the pressing roller 3 is large as indicated by (Y), the amount of the thermosetting matrix resin which permeates the reinforcing substrate 1 to the second surface (1b) decreases. On the other hand, in the case where the length of the contacting portion of the reinforcing substrate 1 which contacts the pressing roller 3 is long because the winding angle $\theta_R$ is small as indicated by (X), the amount of the thermosetting matrix resin which permeates the reinforcing substrate 1 to the second surface (1b) increases. Therefore, by adjusting the winding angle $\theta_R$, the permeation amount of the thermosetting matrix resin is easily controlled.

Referring to FIG. 1, after the thermosetting matrix resin is coated on and permeated the reinforcing substrate in the foregoing process, the reinforcing substrate 1 moves to the heating unit 4. While the reinforcing substrate 1 passes through the heating unit 4 in a non-contact manner, the thermosetting matrix resin is heated so that the thermosetting matrix resin is semi-cured to be the B stage, and a sheet-shape prepreg 22 is thereby obtained. This sheet-shape prepreg 22 is transported by a transport roller 23 and then may be wound up or cut into predetermined lengths. It may be sent to the further optional process.

Figure 4:
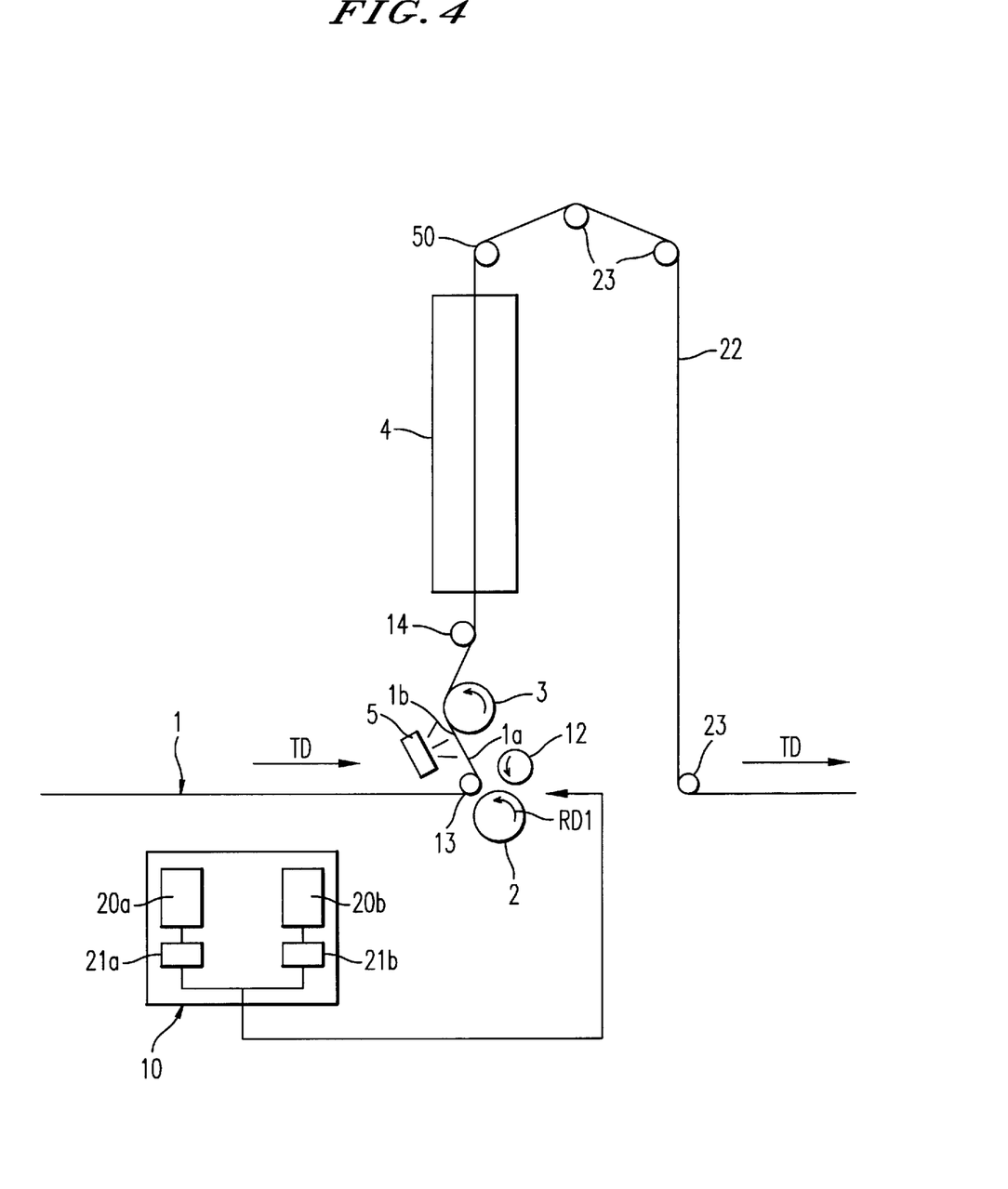
FIG. 4 is a schematic view that shows a prepreg manufacturing apparatus according to a second embodiment of the present invention.

FIG. 4 shows a prepreg manufacturing apparatus according to a second embodiment of the present invention. Referring to FIG. 4, a heating device 5 is placed between the transferring roller 2 and the pressing roller 3 and on the side of the second surface (1b) of the reinforcing substrate 1. As the heating device 5, a non-contact heating device which uses radiation heat, for example, far infrared rays or the like, or a hot air blow is adopted. The other constructions are similar to those as shown in FIG. 1. In the prepreg manufacturing apparatus according to the second embodiment, the thermosetting matrix resin transferred to the first surface (1a) of the reinforcing substrate 1 from the transferring roller 2 is heated by the heating device 5 so as to keep the temperature of the thermosetting matrix resin to prevent a lowering of the viscosity of the thermosetting matrix resin in the molten state. Thus, the permeation of the thermosetting matrix resin through the reinforcing substrate 1 is promoted, and consequently the reinforcing substrate 1 is impregnated with the thermosetting matrix resin in a good condition. The heating device 5 is preferably adjusted to control the temperature of the thermosetting matrix resin so as to optimize the permeation condition of the thermosetting matrix resin through the reinforcing substrate 1.

Figure 5:
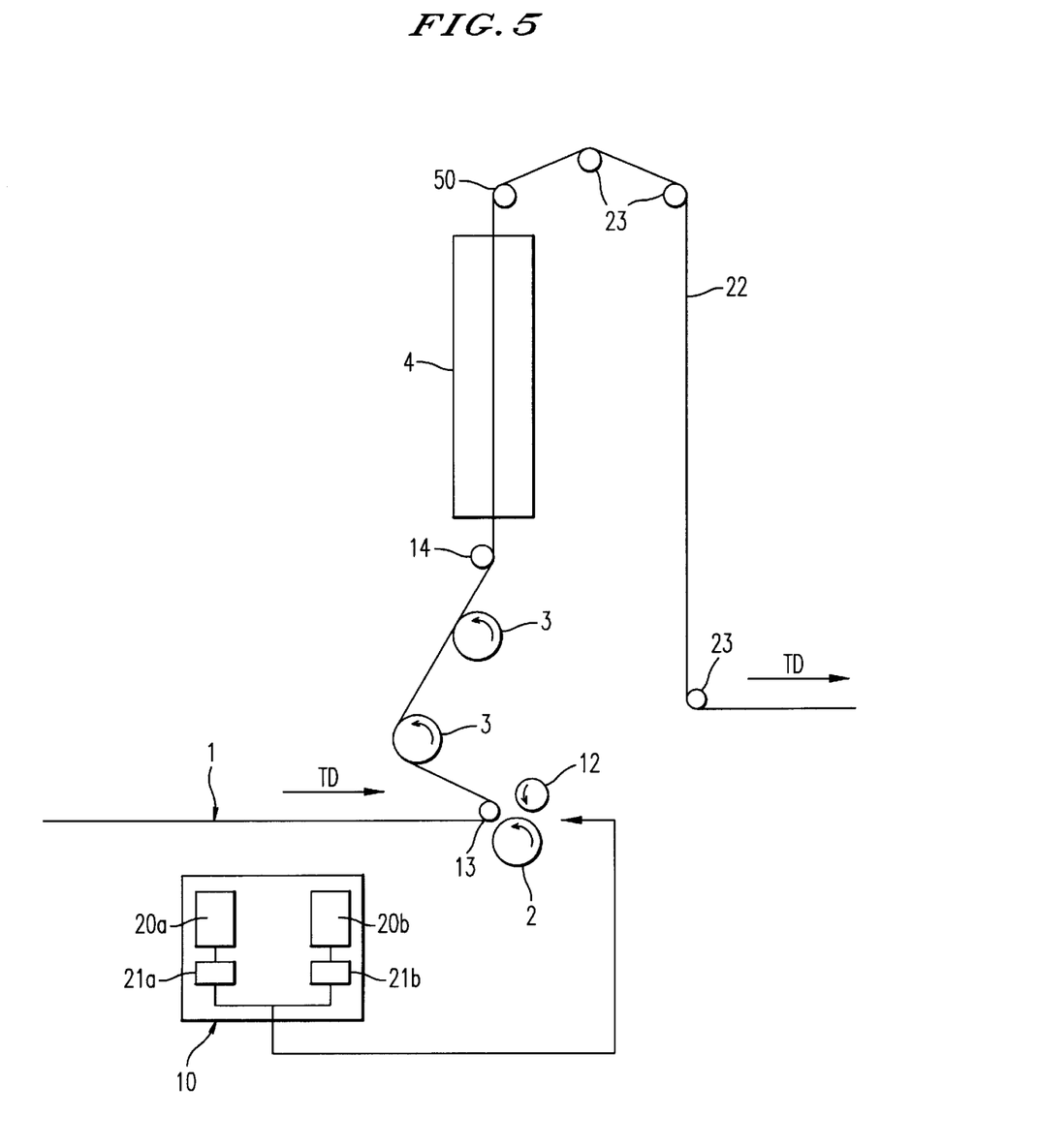
FIG. 5 is a schematic view that shows a prepreg manufacturing apparatus according to a third embodiment of the present invention.

FIG. 5 shows a prepreg manufacturing apparatus according to a third embodiment of the present invention. In the third embodiment, a plurality of the pressing rollers 3 are provided along the traveling direction (TD) of the reinforcing substrate 1 and between the transferring roller 2 and the heating unit 4. The other constructions are similar to those as shown in FIG. 1. Since the thermosetting matrix resin permeates the reinforcing substrate 1 by plural pressing operations performed by the plurality of the pressing rollers 3, the permeation amount of the thermosetting matrix resin can be controlled more precisely. Although the permeation amount of the resin by a single pressing roller 3 is limited, plural pressing rollers 3 can compensate a shortage of the permeation amount. Further, the permeation amount can be more precisely controlled by adjusting respective peripheral velocities of the respective pressing rollers 3.

Figure 6:
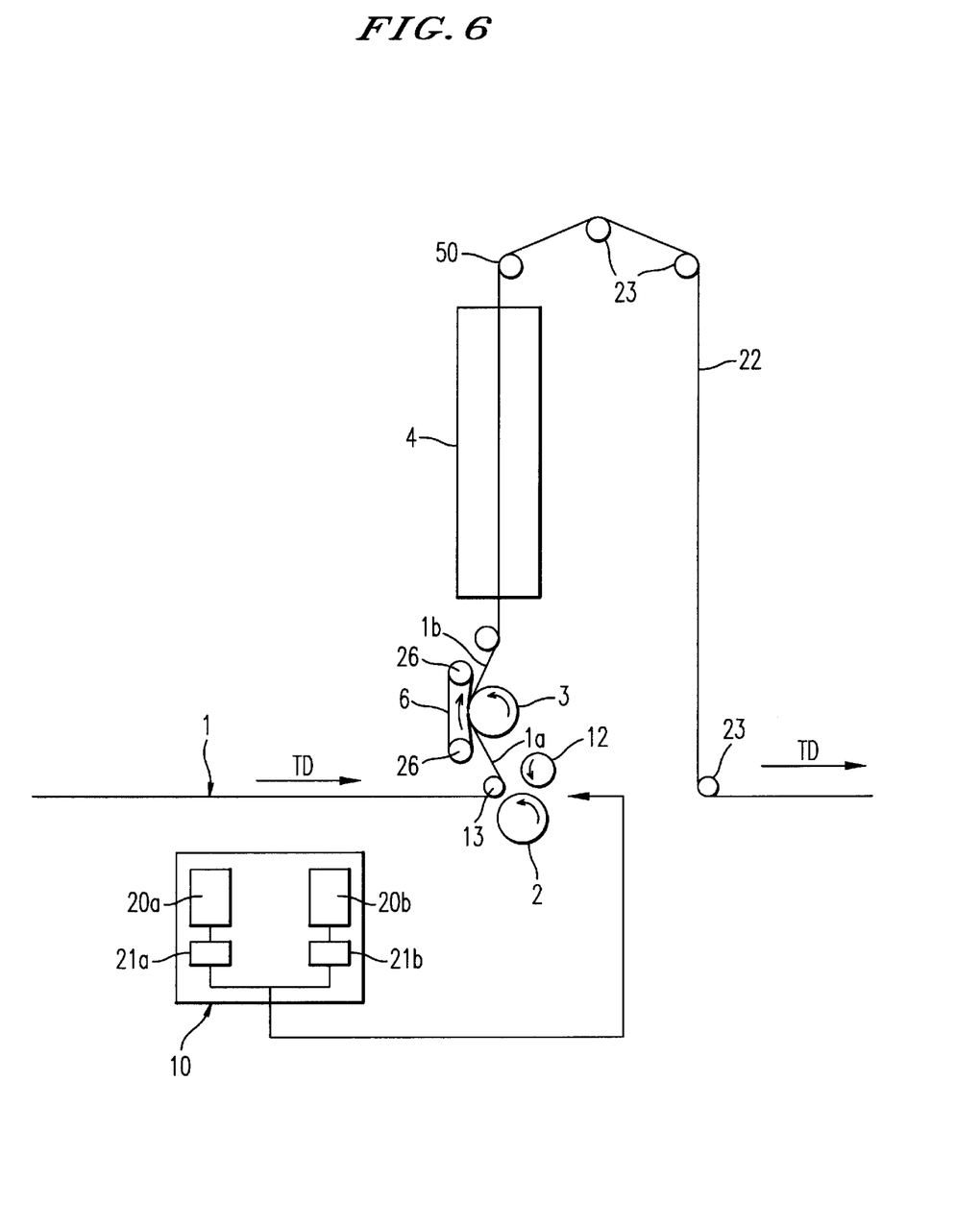
FIG. 6 is a schematic view that shows a prepreg manufacturing apparatus according to a fourth embodiment of the present invention.

FIG. 6 shows a prepreg manufacturing apparatus according to a fourth embodiment of the present invention. In the fourth embodiment, a back-up sheet 6 is placed at an opposite side of the pressing roller 3 with respect to the reinforcing substrate 1 to contact the second surface (1b) of the reinforcing substrate 1. The back-up sheet 6 is an endless belt and made of a material having mold release characteristics with respect to the thermosetting matrix resin, such as a mold-releasing paper. The backup sheet 6 is supported around a pair of rollers (26 and 26). The backup sheet 6 moves in the same direction and at the same speed as those of the reinforcing substrate 1 at the contacting surfaces thereof while contacting the reinforcing substrate 1. Namely, the movement of the backup sheet 6 synchronizes with the movement of the reinforcing substrate 1. The other constructions are similar to those as shown in FIG. 1. In the fourth embodiment, when the thermosetting matrix resin in a molten state permeates the reinforcing substrate 1 to the second surface by the pressure of the pressing roller 3, the thermosetting matrix resin on the second surface (1b) which has permeated the reinforcing substrate 1 spreads on the second surface (1b) of the reinforcing substrate 1 by the operation of the surface tension of the back-up sheet 6. Thus, it is possible to uniformly apply and spread the thermosetting matrix resin on the second surface (1b) of the reinforcing substrate 1 and consequently the application and spread amounts of the thermosetting matrix resin can be increased.

Figure 7:
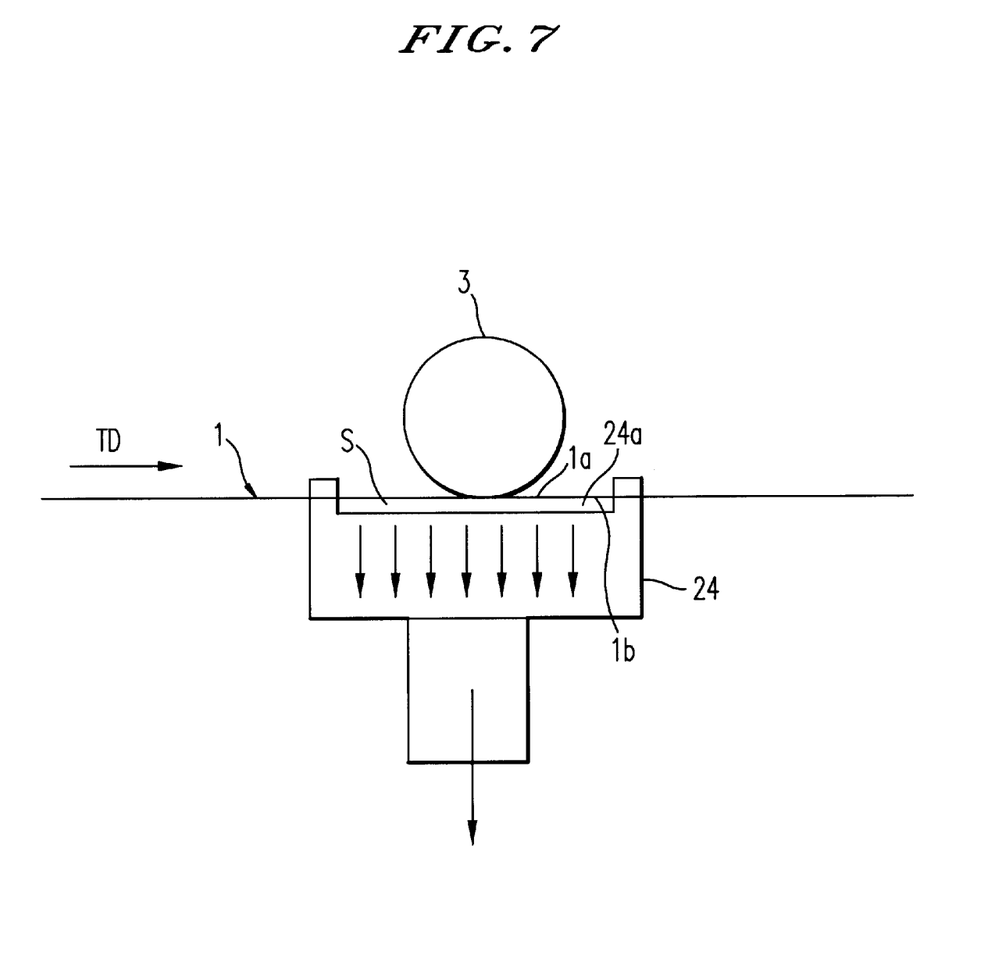
FIG. 7 is a partially enlarged schematic view that shows a fifth embodiment of the present invention.

FIG. 7 shows a suction device of a prepreg manufacturing apparatus according to a fifth embodiment of the present invention. In the fifth embodiment, a suction device 24 is placed facing the pressing roller 3 at an opposite side of the pressing roller 3 with respect to the reinforcing substrate 1. The suction device 24 has a suction face (24a) closely facing the second surface (1b) of the reinforcing substrate 1. The other constructions are similar to those as shown in FIG. 1. In the fifth embodiment, when the suction device 24 sucks an air through the suction face (24a), a pressure in the space (S) formed between the second surface (1b) of the reinforcing substrate 1 and the suction face (24a) becomes negative. Accordingly, around the suction device 24, the pressure applied to the first surface (1a) of the reinforcing substrate 1 becomes higher than that applied to the second surface (1b). Consequently, the thermosetting matrix resin in a molten state which has been transferred onto the first surface (1a) of the reinforcing substrate 1 easily permeates through the reinforcing substrate 1 to the second surface (1b). Therefore, the permeation speed of the thermosetting matrix resin increases and the permeation amount also increases. Moreover, by adjusting the suction action of the suction device 24 to adjust the degree of the negative pressure in the space (S), i.e., the pressure applied to the second surface (1b) of the reinforcing substrate 1, it is possible to control the permeation amount of the thermosetting matrix resin.

Figure 8A:
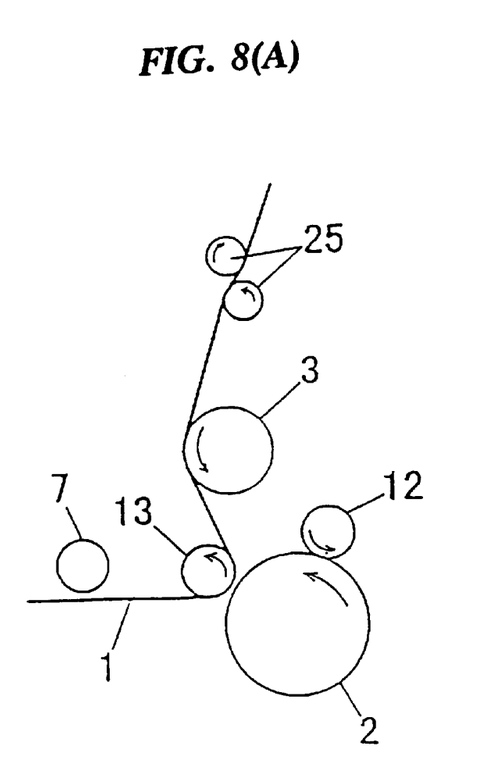
FIG. 8(A) is a partially enlarged schematic view that shows a sixth embodiment of the present invention, a wiping roller staying in a non-contact position with a reinforcing substrate.
Figure 8B:
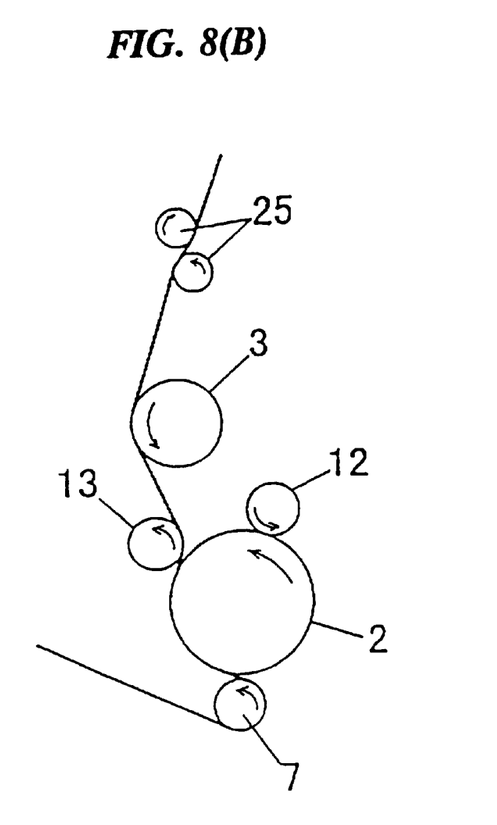
FIG. 8(B) is a partially enlarged schematic of the sixth embodiment shown in FIG. 8(A), the wiping roller being shifting the reinforcing substrate.

FIGS. 8(A) and 8(B) show a main component of a prepreg manufacturing apparatus according to a sixth embodiment of the present invention. In the sixth embodiment, a wiping roller 7 is installed on the side of the second surface (1b) and at an upstream position of the buck-up roller 13 along the traveling direction (TD) of the reinforcing substrate 1. The wiping roller 7 is movable between a side position of the transferring roller 2 as shown in FIG. 8(A) and a lower position below the transferring roller 2 as shown in FIG. 8(B). In FIGS. 8(A) and 8(B), reference numeral 25 indicates a smoothing roller for smoothing the first and second surfaces (1a and 1b) of the reinforcing substrate 1. The other constructions are similar to those as shown in FIG. 1. In the sixth embodiment, during a normal manufacturing operation, the wiping roller 7 stays at the side position as shown in FIG. 8(A) and does not contact the reinforcing substrate 1. In the event of a temporary stoppage due to a certain trouble, since the thermosetting matrix resin fed on the surface of the transferring roller 2 might harden and adhere to the surface of the transferring roller 2, it is necessary to wipe the thermosetting matrix resin on the surface of the transferring roller 2 immediately after the stoppage. Further, when the resin is exchanged to another one, it is also necessary to wipe the thermosetting matrix resin on the surface of the transferring roller 2. Accordingly, when it is necessity to wipe the thermosetting matrix resin on the surface of the transferring roller 2, the wiping roller 7 is moved to the lower position as shown in FIG. 8(B) to wind the reinforcing substrate 1 to the transferring roller 2 and subsequently the wound reinforcing substrate 1 wipes the thermosetting matrix resin on the surface of the transferring roller 2. Therefore, it is possible to prevent the thermosetting matrix resin from adhering to the surface of the transferring roller 2.

Figure 9:
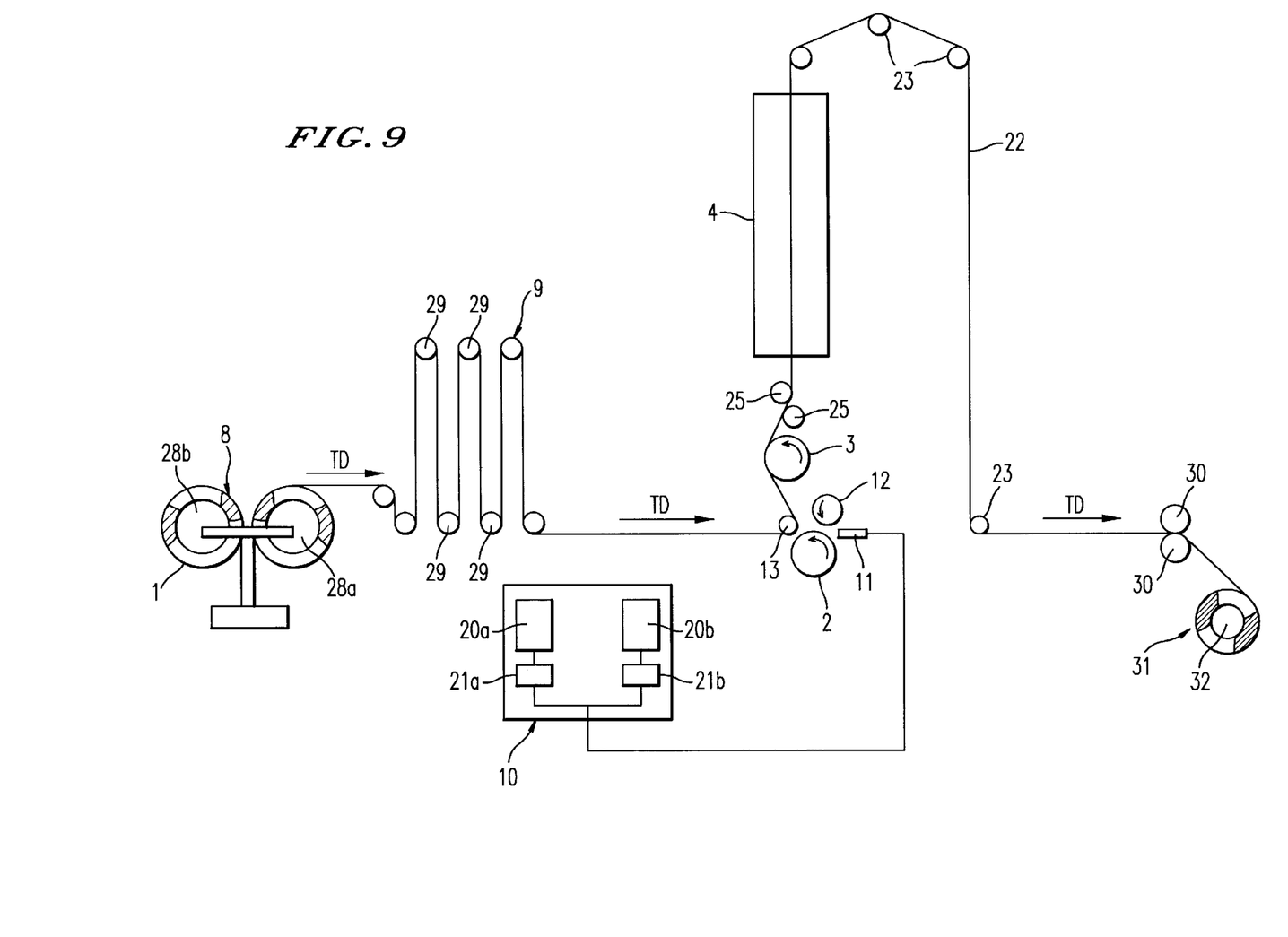
FIG. 9 is a schematic view that shows a prepreg manufacturing apparatus according to a seventh embodiment of the present invention.

FIG. 9 shows a prepreg manufacturing apparatus according to a seventh embodiment of the present invention. In the seventh embodiment, reference numeral 8 designates a feed-out unit having a pair of feed-out rollers (28a and 28b) each of which a long reinforcing substrate 1 is wound to. The reinforcing substrate 1 fed out from either of the feed-out rollers (28a and 28b) moves to an accumulator unit 9. The accumulator unit 9 has a plurality of movable rollers 29 that are movable upward and downward. The reinforcing substrate 1 is supported by each movable roller 29 to wind in the accumulator unit 9. When the feeding of the reinforcing substrate 1 is switched over from either one of the feed-out rollers (28a and 28b) to the other, the operation of the apparatus is continuously carried out by the accumulator unit 9. The back-up roller 13, the transferring roller 2, the pressing roller 3, the smoothing roller 25 and the heating unit 4, which are aforementioned in the foregoing embodiments, are placed along the traveling direction (TD) of the reinforcing substrate 1. Also, the resin feeding unit 10 is connected to a resin gun 11 from which the molten thermosetting matrix resin is fed to the transferring roller 2. Then, as described before, the reinforcing substrate 1 impregnated with the thermosetting matrix resin is heated by the heating unit 4 so that the thermosetting matrix resin is semi-cured to the B-stage, and a sheet-shape prepreg 22 is thereby obtained. The sheet-shape prepreg 22 is transported by a transport roller 23. After the surface of the prepreg 22 is pressurized and compressed by a compaction roller 30, the sheet-shape prepreg 22 is wound up on a wind-up roller 32 of a wind-up unit 31. On the other hand, instead of the wind-up of the sheet-shape prepreg 22 to the wind-up roller 32, the sheet-shape prepreg 22 may be cut into a predetermined size by a cutter unit and then the pieces of sheet-shape prepregs 22 may be stacked on the prepreg stacking device.

Obviously, numerous modifications and variations of the present invention are possible in light of the above teachings. It is therefore to be understood that, within the scope of the appended claims, the invention may be practiced otherwise than as specifically described herein.

What is claimed is new and is desired to be secured by Letters Patent of the United States is:

1. A method for manufacturing a prepreg in which a reinforcing substrate is impregnated with a thermosetting matrix resin, the method comprising:

moving the reinforcing substrate to wind around a circumferential surface of a back-up roller such that an angle $\theta_1$ between a traveling direction of the reinforcing substrate approaching the back-up roller and a traveling direction of the reinforcing substrate going away from the back-up roller is less than 90°;

supplying the thermosetting matrix resin to an outer circumferential surface of a transferring roller which is provided such that the outer circumferential surface of the transferring roller faces the circumferential surface of the back-up roller;

transferring the thermosetting matrix resin which substantially contains no solvent and which is in a molten state from the outer circumferential surface of the transferring roller onto a first surface of the reinforcing substrate by pressing the reinforcing substrate with the back-up roller on the transferring roller while the reinforcing substrate moves;

forcing the thermosetting matrix resin transferred to the first surface to permeate through the reinforcing substrate by pressing at least one pressing roller on the thermosetting matrix resin transferred to the first surface while the reinforcing substrate moves; and heating the reinforcing substrate impregnated with the thermosetting matrix resin to semi-cure the thermosetting matrix resin.

2. The method according to claim 1, further comprising:

keeping the thermosetting matrix resin transferred to the first surface in such a molten state as not to lower a viscosity of the thermosetting matrix resin.

3. The method according to claim 1, wherein a plurality of the pressing rollers are arranged along the traveling direction of the reinforcing substrate.

4. The method according to claim 1, further comprising:

providing a backup sheet which has mold release characteristics with respect to the thermosetting matrix resin and which is arranged facing the pressing roller so as to contact a second surface of the reinforcing substrate, the second surface being opposite to the first surface of the reinforcing substrate.

5. The method according to claim 1, further comprising:

reducing air pressure at a second surface of the reinforcing substrate, the second surface being opposite to the first surface of the reinforcing substrate.

6. The method according to claim 1, wherein the pressing roller is rotated in a direction opposite to the traveling direction of the reinforcing substrate.

7. The method according to claim 1, wherein the pressing roller is rotated in a same direction as the traveling direction of the reinforcing substrate.

8. The method according to claim 1, further comprising:

providing a wiping roller configured to move the reinforcing substrate so as to wind the reinforcing substrate around the transferring roller.

9. The method according to claim 1, wherein a diameter of the transferring roller is larger than that of the back-up roller.

10. A method for manufacturing a prepreg in which a reinforcing substrate is impregnated with a thermosetting matrix resin, the method comprising:

moving the reinforcing substrate in a traveling direction;

supplying the thermosetting matrix resin to an outer circumferential surface of a transferring roller;

transferring the thermosetting matrix resin which substantially contains no solvent and which is in a molten state from the outer circumferential surface of the transferring roller onto a first surface of the reinforcing substrate while the reinforcing substrate moves;

forcing the thermosetting matrix resin transferred to the first surface to permeate through the reinforcing substrate by pressing at least one pressing roller on the thermosetting matrix resin transferred to the first surface while the reinforcing substrate moves;

heating the reinforcing substrate impregnated with the thermosetting matrix resin to semi-cure the thermosetting matrix resin; and displacing a wiping roller, which is apart from the reinforcing substrate while the prepreg is manufactured, to move the reinforcing substrate so as to wind around the transferring roller when it is necessary to wipe the thermosetting matrix resin supplied to the outer circumferential surface of the transferring roller.

\* \* \* \* \*